United States Patent
Bringley

(10) Patent No.: US 7,323,109 B2
(45) Date of Patent: Jan. 29, 2008

(54) COMPOSITION COMPRISING METAL-ION SEQUESTRANT

(75) Inventor: Joseph F. Bringley, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 475 days.

(21) Appl. No.: 10/868,488

(22) Filed: Jun. 15, 2004

(65) Prior Publication Data
US 2005/0277752 A1 Dec. 15, 2005

(51) Int. Cl.
*G21F 9/12* (2006.01)
*C08F 212/14* (2006.01)

(52) U.S. Cl. .................. 210/681; 210/688; 521/30; 521/31; 521/32; 428/441; 428/461; 428/500; 428/507; 252/184

(58) Field of Classification Search ............. 521/30–32; 428/441, 461, 500, 507; 210/681, 688; 252/184
See application file for complete search history.

(56) References Cited

U.S. PATENT DOCUMENTS

| 4,920,036 A | 4/1990 | Totsuka et al. |
| 5,075,197 A | 12/1991 | Yamanouchi et al. |
| 5,217,998 A | 6/1993 | Hedlund et al. |
| 5,560,929 A | 10/1996 | Hedstrand et al. |
| 5,854,303 A | 12/1998 | Powell et al. |
| 6,156,234 A | 12/2000 | Briscoe et al. |
| 2006/0065155 A1* | 3/2006 | Byers et al. .............. 106/31.43 |

FOREIGN PATENT DOCUMENTS

WO WO96/00603 1/1996

OTHER PUBLICATIONS

J. F. Bringley, et al., "An Iron Sequestering Antimicrobial Composition", U.S. Appl. No. 10/868,626, filed Jun. 15, 2004.

* cited by examiner

*Primary Examiner*—Fred Teskin
(74) *Attorney, Agent, or Firm*—Andrew J. Anderson; Sarah Meeks Roberts

(57) ABSTRACT

This invention relates to a composition of matter comprising a functionalized mordant polymer comprising a cationic polymer having an adsorbed metal-ion sequestrant, wherein the metal-ion sequestrant has a stability constant greater than $10^{10}$ with iron (III). It further relates to an article comprising said composition and a method of removing target metal-ions from an environment comprising contacting the environment with said composition.

52 Claims, No Drawings

COMPOSITION COMPRISING METAL-ION SEQUESTRANT

FIELD OF THE INVENTION

The present invention relates to a composition of matter useful for sequestering target metal-ions from a contacting environment, comprising functionalized mordant polymers having a high-affinity and high capacity for metal-ions.

BACKGROUND OF THE INVENTION

Numerous materials and methods have been developed for providing antimicrobial properties to medical items, consumer articles and food packaging. Nearly all of the methods thus far developed rely on the release of bacteriocides or bacteriostats to kill unwanted microbes such as bacteria, viruses, yeast, etc. In order for an antimicrobial article to be effective against harmful micro-organisms, the antimicrobial compound must come in direct contact with micro-organisms present in the surrounding environment, such as food, liquid nutrient or biological fluid. This creates a problem in that the surrounding environment may become contaminated with the antimicrobial compounds, which may potentially alter the color or taste of items such as beverages and foodstuffs, and in the worst case may be harmful to the persons using or consuming those items. The wide spread use of antimicrobial materials may cause further problems in that disposal of the items containing these materials cannot be accomplished without impacting the biological health of the landfill or other site of disposal; and further the antimicrobial compounds may leach into surrounding rivers, lakes and water supplies. The wide spread use of antimicrobial materials may cause yet further problems in that microorganisms may develop resistance to these materials and new infectious microbes and new diseases may develop.

Small concentrations of metal-ions may play an important role in biological processes. For example, Mn, Fe, Ca, Zn, Cu and Al are essential bio-metals, and are required for most, if not all, living systems. Metal-ions play a crucial role in oxygen transport in living systems, and regulate the function of genes and replication in many cellular systems. Calcium is an important structural element in the formation of bones and other hard tissues. Mn, Cu and Fe are involved in metabolism and enzymatic processes. At high concentrations, metals may become toxic to living systems and the organism may experience disease or illness if the level cannot be controlled. As a result, the availability and concentrations of metal-ions in biological environments is a major factor in determining the abundance, growth-rate and health of plant, animal and micro-organism populations.

It has been recognized that iron is an essential biological element, and that all living organisms require iron for survival and replication. Although the occurrence and concentration of iron is relatively high on the earth's surface, the availability of "free" iron is severely limited by the extreme insolubility of iron in aqueous environments. As a result, many organisms have developed complex methods of procuring "free" iron for survival and replication. Controlling the concentration of "free' iron in any biological system can, therefore, allow one to control the growth rates and abundance of micro-organisms. Such control can be of great use for treating sickness and disease, inhibiting bacterial growth, treating wounds, and providing for the general health of plant, animal, micro-organism and human populations. Indeed, iron "chelating" or "sequestering" drugs are used to treat iron deficiency in plants; and are used to treat diseases such as Cooley's anemia (thalassemia), sickle-cell anemia, and iron overload diseases in humans.

Metal-ions may also exist as contaminants in environments such as drinking water, beverages, food, industrial effluents and public waste waters, and radioactive waste. Methods and materials for removing such contaminants are important for cleaning the environment(s) and providing for the safety of the general public.

U.S. Pat. No. 5,217,998 to Hedlund et al. describes a method for scavenging free iron or aluminum in fluids such as physiological fluids by providing in such fluids a soluble polymer substrate having a chelator immobilized thereon. A composition is described which comprises a water-soluble conjugate comprising a pharmaceutically acceptable water-soluble polysaccharide covalently bonded to deferoxamine, a known iron chelator. The conjugate is said to be capable of reducing iron concentrations in body fluids in vivo. The iron chelator is covalently bound to a soluble polymer and thus may not be easily or readily immobilized upon a substrate.

U.S. Pat. No. 6,156,234 to Meyer-Ingold et al. describes novel wound coverings which can remove interfering factors (such as iron ions) from the wound fluid of chronic wounds. The wound coverings may comprise iron chelators covalently bonded to a substrate such as cloth or cotton bandages.

U.S. Pat. No. 5,560,929 to Hedstrand et al. describes dense star polymers or dendrimers having a highly branched interior structure and capable of associating or chelating with metal-ions. Affinity for metal ions is achieved by modifying the dense star polymers with a plurality of oxygen and nitrogen atoms.

U.S. Pat. No. 5,854,303 to Powell et al. describes a polymeric material incorporating a polyvalent cation chelating agent in an amount effective to inhibit the growth of an ocular pathogen. The polymer of the invention may consist of a plurality of monomers, which are covalently modified with an agent capable of chelating a metal-ion, such as an alpha amino carboxylate.

The materials and methods described above, while capable of sequestering metal-ions, are difficult and expensive to prepare and require a covalent linkage of the chelator or chelate-functionality to the polymer or polymeric substrate. The covalent linkage, in addition to requiring multiple steps to achieve, is problematic because it often interferes with the chelators ability to form a complex with a polyvalent cation or metal-ion. The interference is a result of the steric constraint placed upon the chelator by the covalent linkage, i.e., the chelator may no longer be free to wrap itself around the target metal-ion. Further, the covalent linkage may also eliminate one of the "arms" of the chelator and reduce its denticity, i.e, the number of bonds it forms with the target metal-ion. Further still, the linkage may eliminate the chelators ability to bind a specific target metal-ion. Since the linkage is built covalently this limits the adaptability of the method to materials which do not contain the required functionalities for attachment.

Materials and methods are needed that are able to provide immobilized metal-ion chelators that are not sterically constrained and that do not have reduced denticity with the target metal-ion. Materials are needed that are able to target and remove specific metal-ions, while leaving intact the concentrations of beneficial metal-ions. Furthermore, materials are needed that have a high capacity for metal-ions and which provide for the efficient removal of metal-ions in a cost effective manner. Materials and methods are needed for sequestering metal-ions even in extremely low concentrations and removing metal-ion contaminants to levels below 100 parts per billion (ppb) and still further below 10 ppb. Materials and methods are needed for applying immobilized metal-ion sequestrants to numerous items and articles without significantly changing their color or appearance.

SUMMARY OF THE INVENTION

This invention provides a composition of matter comprising functionalized mordant polymers comprising cationic polymers having an adsorbed metal-ion sequestrant, wherein the metal-ion sequestrant has a stability constant greater than $10^{10}$ with iron (III). This invention further provides an article comprising said functionalized mordant polymers and a method of using said functionalized mordant polymers to remove metal-ions from a contacting environment.

The functionalized mordant polymers of the invention are able to target and remove specific metal-ions, while leaving intact the concentrations of beneficial metal-ions. Furthermore, they have a very high capacity for metal-ions and provide for the efficient removal of metal-ions in a cost effective manner. They can sequester metal-ions even in extremely low concentrations and remove metal-ion contaminants to levels below 100 parts per billion (ppb) and still further below 10 ppb. When used in the form of nanoparticles they can be utilized in numerous items and articles without significantly changing their color or appearance and they are easy to apply.

The functionalized mordant polymers can be utilized to remove metal ions which are themselves contaminants, or they can be used to remove metal-ions that are nutrients for biological contaminants. The functionalized mordant polymers do not release chemicals that can be harmful to humans or that may leach into aquatic or surrounding environments. Such materials and methods are cleaner and safer in preventing microbial contamination and infectious disease. The use of polymer aids in coating an article comprising the functionalized mordant polymers may further control the availability of the sequestrant to the target metal-ions. A polymeric barrier layer may control the availability of the sequestrant to the target metal-ions and it may prevent the polymeric layer from being contaminated by microbes or other contaminants. The barrier layer may provide several other functions including improving the physical strength and toughness of the article and improving resistance to scratching, marring, cracking, etc.

Making the composition of this invention is a remarkably simple method of immobilizing metal-ion chelators on the surfaces, and the interior, of latex mordant particles in which the metal-ion sequestrant is adsorbed to a charged mordanting functional group attached to the latex particle. The metal-ion sequestrant is adsorbed in its "whole" form and thus its ability to bind a target metal-ion is not inhibited.

DETAILED DESCRIPTION OF THE INVENTION

The functionalized mordant polymers of the invention may be used to remove metal-ions from a surrounding environment. In many instances, it is necessary to remove metal-ions from environments such as drinking water, food, biological fluids, industrial effluents and radioactive waste. The functionalized mordant polymers of the invention are placed in contact with the environment in an amount sufficient to bind the target metal-ion(s), and are then removed or separated from the environment, leaving the environment substantially free of the target metal-ion(s).

The invention provides a composition of matter comprising a functionalized mordant polymer comprising a cationic polymer having an adsorbed metal-ion sequestrant, wherein the metal-ion sequestrant has a stability constant greater than $10^{10}$ with iron (III). The functionalized mordant polymers of the invention comprise cationic polymers having an adsorbed metal-ion sequestrant. The cationic polymer of the invention may, in principle, be any polymer that contains a permanently charged cationic group. Polymers which may become cationic as a result: of protonation at low pH, although potentially useful, are not considered since their ability to electrostatically bind, or "mordant", oppositely charged molecules, complexes, etc, may be limited by the pH of the system, therefore, the functional groups of such polymers are not "permanently" charged. Cationic polymers may be formed by incorporating cationic functional groups within the polymer backbone or as pendant groups covalently attached to the polymeric backbone. Cationic polymers may be formed by grafting, or through co-polymerization of polymers, oligomers or monomers with cationic functional groups. Examples of cationic functional groups include quaternary ammonium and quaternary phosphonium groups. Cationic polymers suitable for use in the invention include ammonium and phosphonium ion salts of polyvinyl alcohol, polyurethanes, polyester, nylon, high nitrile resins, polyethylene-polyvinyl alcohol copolymer, polystyrene, ethyl cellulose, cellulose acetate, cellulose nitrate, polyacrylic acid, polyamides, polymethacrylates, polyethylene terephthalates, polyethylene, polypropylene, or polyacrylonitrile.

Commercial cationic polymers suitable for practice of the invention are Celquat SC240C (National Starch and Chemical Co.) and Quatrisoft LM-200 (Amerchol Corp.). Cationic modification of polymers has been discussed in U.S. Pat. No. 5,789,070, U.S. Pat. No. 4,080,346 and in U.S. Pat. No. 3,958,995.

In a preferred embodiment the cationic polymer is selected from a mordant polymer having the general formula:

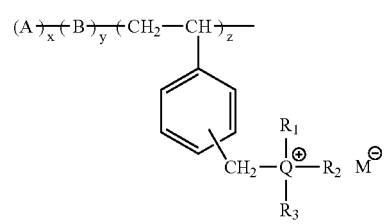

wherein:

A represents units of an addition polymerizable monomer containing at least two ethylenically unsaturated groups;

B represents units of a copolymerizable, $\alpha,\beta$-ethylenically unsaturated monomer;

Q is N or P;

$R_1$, $R_2$ and $R_3$ each independently represent a carbocyclic or alkyl group;

$M^-$ is an anion;

x is from 0.25 to 10 mole percent;

y is from 0 to 90 mole percent, preferably 0 to 45 mole percent; and z is from 10 to 99 mole percent, preferably 40 to 90 mole percent.

Preferred mordant polymers used in the invention comprise units having the formula above wherein A is a repeating unit of an addition polymerizable monomer containing at least two ethylenically unsaturated groups, such as vinyl groups generally having the following structure:

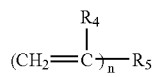

wherein n is from 1 to 10, preferably 2 or 3; each $R_4$ independently represents hydrogen or methyl; and $R_5$ is a linking group comprising one or more condensation linkages such as amide, sulfonamide, esters such as sulfonic acid ester, arylene etc., or a condensation linkage and an organic nucleus such as alkylene, e.g., methylene, ethylene, trimethylene, arylene, etc.

Suitable monomers from which the repeating units of A are formed include divinylbenzene, allyl acrylate, allyl methacrylate, N-allylmethacrylamide, etc.

B in the above formula is a unit of a copolymerizable α,β-ethylenically unsaturated monomer (including two, three or more repeating units), such as ethylene, propylene, 1-butene, isobutene, 2-methylpentene, etc. A preferred class of ethylenically unsaturated monomers which may be used include the lower 1-alkenes having from 1 to 6 carbon atoms; styrene, and tetramethylbutadiene and methyl methacrylate.

$R_1$, $R_2$ and $R_3$ in the above formula each independently represents a carbocyclic group such as aryl, aralkyl, and cycloalkyl such as benzyl, phenyl, p-methyl-benzyl, cyclohexyl, cyclopentyl, etc.; or an alkyl group preferably containing from 1 to 20 carbon atoms such as methyl, ethyl, propyl, isobutyl, pentyl, hexyl, heptyl, decyl, etc. In a preferred embodiment, $R_1$ and $R_2$ are methyl and $R_3$ is benzyl.

$M^-$ in the above formula is an anion, i.e., a negative salt forming an ionic radical or atom such as a halide, e.g., bromide or chloride, sulfate, alkyl sulfate, alkane or arene sulfonate, acetate, phosphate, etc.

In yet another preferred embodiment the cationic polymer comprises a cationic latex particle. A latex is a polymer that has been cross-linked to form a polymeric particle having a distinct size and shape. Latex particles are typically spherical but may be other shapes, or irregular in shape. Latex particles may be dispersed or suspended in liquids and applied to surfaces to form a film. Latexes may also be blended with other polymers or other reagents and are versatile with respect to processing and formulation into products. They are distinct from soluble polymers which have no definitive "particle" size and shape. The cationic latex particles of the invention contain "mordanting" groups such as a quaternary ammonium or quaternary phosphonium cationic groups. The "mordanting" groups may reside in the interior of the particle and at the surface of the particle. It is preferred that the latex contains as many mordanting groups as possible. In this manner, the mordanted molecules (herein metal-ion sequestrants) being oppositely charged, are adsorbed within the latex mordant particles. The mordanted molecules and latex mordant particles are bound electrostatically and also as a result of van der Waals forces. The mordanted molecules are thus immobilized within the interior and upon the surfaces of the latex mordant particles. It is preferred that the cationic latex particles have an average particle size of less than 500 nm. It is further preferred that the cationic latex particles have an average size of less than 100 nm. Particles of this size can be applied to clear, transparent surfaces without causing a hazy or a cloudy appearance at the surface. This allows the particles of the present invention to be applied to consumer items, or other items without changing the appearance of that item. Preferred cationic latex polymers are those described by the formula given above for cationic polymers. The cationic latex particles form functionalized mordant latex particles.

The functionalized mordant polymers of the invention have an electrostatically attached (or mordanted) metal-ion sequestrant and have a high-affinity for metal-ions. They are able to sequester or remove metal-ions from aqueous or biological environments. Preferably, said metal-ion sequestrant has a high-affinity for iron, copper, zinc, aluminum or heavy metals. The term heavy metals refers to metals having an atomic weight greater than about 100 g/mol, such as Ag, Au, Tl, Pb, Cd, and also lanthanides such as La, Ce, Sm, Eu, and Gd, and radioactive metals such as Th, U and Pu. It is also preferred that the functionalized mordant polymers have a high-affinity for biologically significant metal-ions, such as Zn, Cu, Mn and Fe.

A measure of the "affinity" of metal-ion sequestrants for various metal-ions is given by the stability constant (also often referred to as critical stability constants, complex formation constants, equilibrium constants, or formation constants) of that sequestrant for a given metal-ion. Stability constants are discussed at length in "Critical Stability Constants", A. E. Martell and R. M. Smith, Vols. 1-4, Plenum, NY (1977), "Inorganic Chemistry in Biology and Medicine", Chapter 17, ACS Symposium Series, Washington, D.C. (1980), and by R. D. Hancock and A. E. Martell, Chem. Rev. vol. 89, p. 1875-1914 (1989). The ability of a specific molecule or ligand to sequester a metal-ion may depend also upon the pH, the concentrations of interfering ions, and the rate of complex formation (kinetics). Generally, however, the greater the stability constant, the greater the binding affinity for that particular metal-ion. Often the stability constants are expressed as the natural logarithm of the stability constant. Herein the stability constant for the reaction of a metal-ion (M) and a sequestrant or ligand (L) is defined as follows:

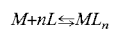

where the stability constant is $\beta_n = [ML_n]/[M][L]^n$ wherein $[ML_n]$ is the concentration of "complexed" metal-ion, $[M]$ is the concentration of free (uncomplexed) metal-ion and $[L]$ is the concentration of free ligand. The log of the stability constant is log $\beta_n$, and n is the number of ligands which coordinate with the metal. It follows from the above equation that if $\beta_n$ is very large, the concentration of "free" metal-ion will be very low. Ligands with a high stability constant (or affinity) generally have a stability constant greater than $10^{10}$ or a log stability constant greater than 10 for the target metal. It is preferred that the metal-ion sequestrants of the invention have a stability constant for iron greater than $10^{20}$. It is further preferred that the metal-ion sequestrants of the invention have a stability constant for iron greater than $10^{30}$. Table 1 lists common ligands (or sequestrants) and the natural logarithm of their stability constants (log $\beta_n$) for selected metal-ions.

TABLE 1

Common ligands (or sequestrants) and the natural logarithm of their stability constants (log $\beta_n$) for selected metal-ions.

| Ligand | Ca | Mg | Cu(II) | Fe(III) | Al | Ag | Zn |
|---|---|---|---|---|---|---|---|
| alpha-amino carboxylates | | | | | | | |
| EDTA | 10.6 | 8.8 | 18.7 | 25.1 | | 7.2 | 16.4 |
| DTPA | 10.8 | 9.3 | 21.4 | 28.0 | 18.7 | 8.1 | 15.1 |
| CDTA | 13.2 | | 21.9 | 30.0 | | | |
| NTA | | | | 24.3 | | | |
| DPTA | 6.7 | 5.3 | 17.2 | 20.1 | 18.7 | 5.3 | |
| PDTA | 7.3 | | 18.8 | | | | 15.2 |
| citric Acid | 3.50 | 3.37 | 5.9 | 11.5 | 7.98 | 9.9 | |
| salicylic acid | | | | 35.3 | | | |
| Hydroxamates | | | | | | | |
| Desferrioxamine B | | | | 30.6 | | | |
| acetohydroxamic acid | | | | 28 | | | |
| Catechols | | | | | | | |
| 1,8-dihydroxy naphthalene 3,6 sulfonic acid | | | | 37 | | | |
| MECAMS | | | | 44 | | | |
| 4-LICAMS | | | | 27.4 | | | |
| 3,4-LICAMS | 16.2 | | | 43 | | | |
| 8-hydroxyquinoline | | | | 36.9 | | | |
| disulfocatechol | 5.8 | 6.9 | 14.3 | 20.4 | 16.6 | | |

EDTA is ethylenediamine tetraacetic acid and salts thereof,
DTPA is diethylenetriaminepentaacetic acid and salts thereof,
DPTA is Hydroxylpropylenediaminetetraacetic acid and salts thereof,
NTA is nitrilotriacetic acid and salts thereof,
CDTA is 1,2-cyclohexanediamine tetraacetic acid and salts thereof,
PDTA is propylenediammine tetraacetic acid and salts thereof.
Desferrioxamine B is a commercially available iron chelating drug, desferal ®.
MECAMS, 4-LICAMS and 3,4-LICAMS are described by Raymond et al. in "Inorganic Chemistry in Biology and Medicine", Chapter 18, ACS Symposium Series, Washington, D.C. (1980).
Log stability constants are from "Critical Stability Constants", A. E. Martell and R. M. Smith, Vols. 1-4, Plenum Press, NY (1977); "Inorganic Chemistry in Biology and Medicine", Chapter 17, ACS Symposium Series, Washington, D.C. (1980); R. D. Hancock and A. E. Martell, Chem. Rev. vol. 89, p. 1875-1914 (1989) and "Stability Constants of Metal-ion Complexes, The Chemical Society, London", 1964.

In many instances, a disease may be associated with a particular metal-ion, either due to a deficiency of this metal-ion, or due to an overload (overdose) of this metal-ion. In such cases it may be desirable to synthesize a functionalized mordant polymer with a very high specificity or selectivity for a given metal-ion. Functionalized mordant polymers of this nature may be used to control the concentration of the target metal-ion and thus treat the disease or illness associated with this metal-ion. One skilled in the art may prepare such functionalized mordant polymers by selecting a metal-ion sequestrant having a high specificity for the target metal-ion. The specificity of a metal-ion sequestrant for a target metal-ion is given by the difference between the log of the stability constant for the target metal-ion, and the log of the stability constant for the interfering metal-ions. For example, if a treatment required the removal of Fe(III), but it was necessary to leave the Ca-concentration unaltered, then from Table 1,3,4-LICAMS would be a suitable choice since the difference between the log stability constants 43–16.2=26.8, is greatest of the ligands in Table 1.

It is preferred that the functionalized mordant polymers have a high stability constant for the target metal-ion(s). The stability constant for the functionalized mordant polymers will largely be determined by the stability constant for the adsorbed metal-ion sequestrant. However, the stability constant for the functionalized mordant polymers may vary somewhat from that of the adsorbed metal-ion sequestrant. Generally, it is anticipated that metal-ion sequestrants with high stability constants will give functionalized mordant polymers with high stability constants. For a particular application it may be desirable to have a functionalized mordant polymer with a high specificity for a particular metal-ion. In most cases, the functionalized mordant polymer will have a high specificity for a particular metal-ion if the stability constant for that metal-ion is about $10^6$ greater than for other ions present in the system Metal-ion sequestrants may be chosen from various organic molecules. Such molecules having the ability to form complexes with metal-ions are often referred to as "chelators", "complexing agents", and "ligands". Certain types of organic functional groups are known to be strong "chelators" or sequestrants of metal-ions. It is preferred that the sequestrants of the invention contain alpha-amino carboxylates, hydroxamates, or catechol, functional groups. It is particularly preferred that the sequestrants of the invention contain hydroxamates, or catechol, functional groups. This is preferred because these sequestrants have very high stability constants with Fe(III), see Table 1.

Alpha-amino carboxylates have the general formula:

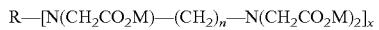

where R is an organic group such as an alkyl or aryl group; M is H, or an alkali or alkaline earth metal such as Na, K, Ca or Mg, or Zn; n is an integer from 1 to 6; and x is an integer from 1 to 3. Examples of metal-ion sequestrants containing alpha-amino carboxylate functional groups include ethylenediaminetetraacetic acid (EDTA), ethylenediaminetetraacetic acid disodium salt, diethylenetriaminepentaacetic acid (DTPA), Hydroxylpropylenediaminetetraacetic acid (DPTA), nitrilotriacetic acid, triethylenetetraaminehexaacetic acid, N,N-bis(o-hydroxybenzyl) ethylenediamine-N,N diacteic acid, and ethylenebis-N,N'-(2-o-hydroxyphenyl)glycine.

Hydroxamates (or often called hydroxamic acids) have the general formula:

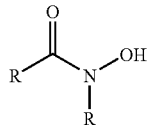

where R is an organic group such as an alkyl or aryl group. Examples of metal-ion sequestrants containing hydroxamate functional groups include acetohydroxamic acid, benzohydroxamic acid and desferroxamine B, the iron chelating drug, desferal.

Catechols have the general formula:

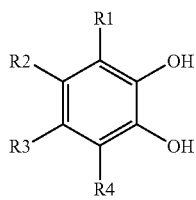

Where R1, R2, R3 and R4 may be H, an organic group such as an alkyl or aryl group, or a carboxylate or sulfonate group. Examples of metal-ion sequestrants containing catechol functional groups include catechol, disulfocatechol, dimethyl-2,3-dihydroxybenzamide, mesitylene catecholamide (MECAM) and derivatives thereof, 4,5-dihydroxynaphthalene-2,7-disulfonic acid (sometimes called 1,8-dihydroxynaphthalene-3,6-sulfonic acid), and 2,3-dihydroxynaphthalene-6-sulfonic acid.

In one embodiment the metal-ion sequestrant comprises a siderophore. Siderophores are natural metal-ion sequestrants that are synthesized by micro-organisms for the purpose of procuring free iron for the cell. Micro-organisms produce siderophores in response to iron depletion or deficiency. Siderophores, such as desferroxamine B, are preferred because they may have very high affinites for iron (III). Siderophores (natural and synthetic) are described at length in "CRC Handbook of Microbial Iron Chelates", Winkelmann ed., CRC Press (1991).

Preffered metal-ion sequestrants are ethylenediaminetetraacetic acid (EDTA), ethylenediaminetetraacetic acid disodium salt, diethylenetriaminepentaacetic acid (DTPA), Hydroxylpropylenediaminetetraacetic acid (DPTA), nitrilotriacetic acid, triethylenetetraaminehexaacetic acid, N,N'-bis (o-hydroxybenzyl) ethylenediamine-N,N'diacteic acid, and ethylenebis-N,N'-(2-o-hydroxyphenyl)glycine, acetohydroxamic acid, desferroxamine B, dihydroxamic acid, salicylic acid, catechol, disulfocatechol, dimethyl-2,3-dihydroxybenzamide, 5-sulfo-2,3-dihydroxydimethylbenzamide, mesitylene catecholamide (MECAM) and derivatives thereof, LICAMS and derivatives thereof, 4,5-dihydroxynaphthalene-2,7-disulfonic acid (sometimes called 1,8-dihydroxynaphthalene-3,6-sulfonic acid), and 2,3-dihydroxynaphthalene-6-sulfonic acid.

The functionalized mordant polymers of the present invention may be prepared by simple mixing methods. An aqueous or solvent based dispersion of the cationic polymer is prepared at a temperature below the boiling point of the mixture. To this dispersion, is then added the sequestrant having the opposite charge as that of the cationic polymer. The chelating group is then electrostatically attracted to the cationic polymer and is adsorbed therein. Alternatively, the cationic polymer may be applied to a surface or to an article, and dried, and subsequently the metal-ion sequestrant adsorbed as described above. It is preferred that the sequestrant molecules are somewhat hydrophobic in addition to being charged oppositely to that of the latex mordant particles. This is preferred because it helps to permanently attach the sequestrant to the cationic polymer, as a result of hydrophobic-hydrophobic interactions, and as a result of van der Waals forces. The loading of the cationic polymer, or ratio of moles of metal-ion sequestrant to grams of cationic polymer, is determined by the exchange capacity of the cationic polymer. The exchange capacity, in turn, is determined by the number of cationic mordanting groups per gram of polymer. It is preferred that the exchange capacity is as high as possible. The loading of the metal-ion sequestrant should be equal to, or less than, the exchange capacity of the cationic polymer. If the metal-ion sequestrant contains multiple charges per molecule, e.g., $EDTA^{4-}$, than the loading should be such that the moles of metal-ion sequestrant times the charge is equal to or less than the exchange capacity of the cationic polymer. In the case of EDTA; moles EDTA×4≦exchange capacity. It is preferred that substantially all of of the metal-ion sequestrant is bound or mordanted by the cationic polymer. Metal-ion sequestraint that is not bound to the cationic polymer may dissolve and quickly diffuse through a system; and may be ineffective in removing metal-ions from the system.

In a preferred embodiment the composition of matter of the invention further comprises a polymer. The polymer may serve as a binder or as a glue to attach the functionalized mordant polymers to the surfaces of articles such as plastic wraps, papers, cellophane and polymer films, glass and metal containers and other packaging materials, especially food packaging materials. The composition of matter of the invention may also be applied to medical items such as bandages, gauze, cotton and personal hygiene items such as diapers, bandaids, and other items which come into contact with biological and body fluids. Preferred polymers are selected from one or more of polyvinyl alcohol, cellophane, water-based polyurethanes, polyester, nylon, high nitrile resins, polyethylene-polyvinyl alcohol copolymer, polystyrene, polyethylene glycol, ethyl cellulose, cellulose acetate, cellulose nitrate, aqueous latexes, polyacrylic acid, polystyrene sulfonate, polyamide, polymethacrylate, polyethylene terephthalate, polystyrene, polyethylene and polypropylene or polyacrylonitrile or copolymers thereof. The functionalized mordant polymer may also be immobilized on or in a support, for example paper, metal, plastic, glass, wood or textiles.

The following discussion deem functionalized mordant polymers to include functionalized mordant latex particles where appropriate. The invention also provides an article comprising immobilized functionalized mordant polymers (as described in detail above), comprising functionalized mordant polymers comprising a cationic polymer having an adsorbed metal-ion sequestrant, wherein metal-ion sequestrant has a stability constant greater than $10^{10}$ with iron (III). In one embodiment functionalized mordant polymers are incorporated into the materials forming the article. In another embodiment the functionalized mordant polymers are contained in a polymeric layer, said layer being located on the surface of the article. This is preferred because it provides the maximum contact between the polymeric layer and the surrounding environment. It is preferred that the polymeric layer is permeable to liquid media, and it is further preferred that the polymeric layer is permeable to aqueous media. This is preferred because permeability facilitates the contact of the contaminant metal-ions with the immobilized functionalized mordant polymers, which, in turn, facilitates the sequestration of the metal-ions at the particle surfaces. A measure of the permeability of various polymeric addenda to water is given by the permeability coefficient, P which is given by $$P=(\text{quantity of permeate})(\text{film thickness})/[\text{area} \times \text{time} \times (\text{pressure drop across the film})]$$

Permeability coefficients and diffusion data of water for various polymers are discussed by J. Comyn, in *Polymer Permeability*, Elsevier, N.Y., 1985 and in "Permeability and Other Film Properties Of Plastics and Elastomers", Plastics Design Library, NY, 1995. The higher the permeability coefficient, the greater the water permeability of the polymeric media. The permeability coefficient of a particular polymer may vary depending upon the density, crystallinity, molecular weight, degree of cross-linking, and the presence of addenda such as coating-aids, plasticizers, etc. It is preferred that the polymer has a water permeability of greater than 1000 $[(cm^3 \, cm)/(cm^2 sec/Pa)] \times 10^{13}$.

A support may be provided between the article and the polymeric layer. In this manner the composition of matter of the invention may be applied to the surfaces of a support by methods such as blade coating, dip coating, curtain and rod coating. The polymeric layer may also be applied by painting, spraying, casting, molding, blowing, extruding, etc. Supports suitable for practice of the invention are papers such as resin-coated paper, plain paper, coated paper, synthetic paper, melt-extrusion-coated paper, laminated paper, and polymeric supports such as cellulose derivatives, polyesters, polyethylene, polypropylene, mylar and poly ethylene terephthalate (PET).

In a preferred embodiment, the article of the invention further comprises a barrier layer; wherein the polymeric layer is between the surface of the article and the barrier layer and wherein the barrier layer does not contain the functionalized mordant polymers. The barrier layer may provide several functions including improving the physical strength and toughness of the article and resistance to scratching, marring, cracking, etc. However, the primary purpose of the barrier layer is to provide a barrier through which micro-organisms cannot pass. It is important to limit, or eliminate, the direct contact of micro-organisms with the surfaces of the functionalized mordant polymers, since many micro-organisms, under conditions of iron deficiency, may bio-synthesize molecules which are strong chelators for iron, and other metals. These bio-synthetic molecules are called "siderophores" and their primary purpose is to procure iron for the micro-organisms. Thus, if the microorganism are allowed to directly contact the functionalized mordant polymers of the invention, they may find a rich source of iron there, and begin to colonize directly at these surfaces. The siderophores produced by the micro-organisms may compete with the functionalized mordant polymers for the iron (or other bio-essential metal) at their surfaces. The barrier layer of the invention does not contain functionalized mordant polymers, and because micro-organisms are large, they may not pass or diffuse through the barrier layer. The barrier layer thus prevents contact of the micro-organisms with the polymeric layer containing the immobilized functionalized mordant polymers of the invention.

It is preferred that the barrier layer is permeable to liquid media. This is preferred because metal-ions in solution may then readily diffuse through the barrier layer and become sequestered in the underlying polymeric layer containing the functionalized mordant polymers. Thus, the barrier layer spatially separates the micro-organisms from the polymeric sequestration layer. It is further preferred that the barrier layer is permeable to aqueous media. It is preferred that the polymer(s) of the barrier layer has a water permeability of greater than $1000 \; [(cm^3 \; cm)/(cm^2 sec/Pa)] \times 10^{13}$. Preferred polymers for use in the barrier layer are one or more of polyvinyl alcohol, cellophane, water-based polyurethanes, polyester, nylon, high nitrile resins, polyethylene-polyvinyl alcohol copolymer, polystyrene, ethyl cellulose, cellulose acetate, cellulose nitrate, aqueous latexes polyacrylic acid, polystyrene sulfonate, polyamide, polymethacrylate, polyethylene terephthalate, polystyrene, polyethylene, polypropylene, or polyacrylonitrile or copolymers thereof. It is preferred that the barrier layer has a thickness in the range of 0.1 microns to 10.0 microns.

The invention also provides a method of removing target metal-ion(s) from an environment comprising contacting the environment with a composition comprising functionalized mordant polymers, including particles, comprising a cationic polymer having an adsorbed metal-ion sequestrant, wherein the metal-ion sequestrant has a stability constant greater than $10^{10}$ with iron (III). The term "environment" refers to environments that articles or items comprising the inventive composition may come in contact with, and include aqueous and non-aqueous environments containing metal-ion contaminants. Aqueous environments contemplated as applicable to the invention include water, waste water, industrial effluents and radioactive waste, and consumable environments such as drinking water, beverages and food, consumer household environments such as cosmetics, shampoos, tooth paste, etc. Typical environments encountered also include biological and body, fluids. The target metal-ion concentration in the contacting environment should be reduced to as low as possible. Preferably the target metal-ion concentration in the liquid medium is reduced to less than 100 ppb. In one embodiment the target metal ion is iron. Preferably the iron concentration in the liquid medium is reduced to less than 50 ppb.

The following examples are intended to illustrate, but not to limit the invention.

EXAMPLES

The metal-ion sequestrant, 6,7-dihydroxy-2-naphthalenesulfonate, sodium salt was purchased from City Chemical. An aqueous solution was prepared as follows: 6,7-dihydroxy-2-naphthalenesulfonate, Na (20.0 g) was dissolved in 200 ml of pure distilled water and the pH of the solution adjusted to 8.5 with the addition of 1.0 N aqueous NaOH; the final solution contained 0.090 g chelate/g. An aqueous suspension of a cationic latex mordant particle having the structure and composition shown below was used in the examples, hereafter referred to as Latex 1. The latex had an average particle diameter of 80 nm with a standard deviation of 11 nm, and the suspension was 15.0% solids by weight.

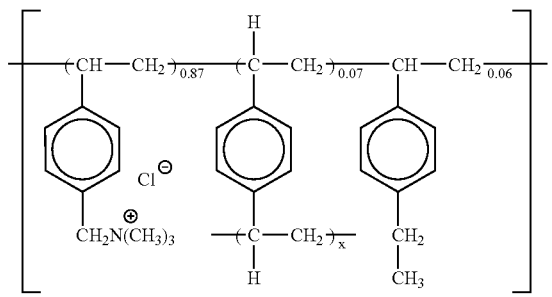

Preparation of Functionalized Mordant Polymers

Functionalized Mordant Polymer A

To 50.00 g of a stirred suspension of the cationic latex mordant particle described above was added 24.4 g of the chelate solution described above and the suspension stirred for 20 min.

Functionalized Mordant Polymer B

To 50.00 g of a stirred suspension of the cationic latex mordant particle described above was added 48.9 g of the chelate solution described above and the suspension stirred for 20 min.

Functionalized Mordant Polymer C

To 50.00 g of a stirred suspension of the cationic latex mordant particle described above was added 73.3 g of the chelate solution described above and the suspension stirred for 20 min.

Preparation of Polymeric Layers of Functionalized Mordant Polymers

Coating 1. A coating was prepared as follows: 14.0 grams of the suspension of Functionalized Mordant Polymer (A) above was combined with to 76.2 grams of pure distilled water and 8.83 g of a 40% solution of the polyurethane Permax 220 (Noveon Chemicals). 1.0 g of a 10% solution of the surfactant OLIN 10G was added as a coating aid. The mixture was then stirred and blade-coated onto a polymeric support using a150 micron doctor blade. The coating was then dried at 40-50° C., to produce a clear transparent film having 2.15 g/m² of functionalized mordant polymer and 5.4 g/m² of polyurethane.

Coating 2. A coating was prepared as follows: 18.5 grams of the suspension of Functionalized Mordant Polymer (B) above was combined with to 71.7 grams of pure distilled water and 8.83 g of a 40% solution of the polyurethane Permax 220 (Noveon Chemicals). 1.0 g of a 10% solution of the surfactant OLIN 10G was added as a coating aid. The mixture was then stirred and blade-coated onto a polymeric support using a 150 micron doctor blade. The coating was then dried at 40-50° C., to produce a clear transparent film having 2.15 g/m² of functionalized mordant polymer and 5.4 g/m² of polyurethane.

Coating 3. A coating was prepared as follows: 23.2 grams of the suspension of Functionalized Mordant Polymer (C) above was combined with to 67.0 grams of pure distilled water and 8.83 g of a 40% solution of the polyurethane Permax 220 (Noveon Chemicals). 1.0 g of a 10% solution of the surfactant OLIN 10G was added as a coating aid. The mixture was then stirred and blade-coated onto a polymeric support using a 150 micron doctor blade. The coating was then dried at 40-50° C., to produce a clear transparent film having 2.15 g/m² of functionalized mordant polymer and 5.4 g/m² of polyurethane.

Sequestration of Iron from a Model Biological Environment

Examples (1-6) and Comparison Examples C-1, C-2

A "model" biological liquid medium was prepared as follows: 25.0 g of sucrose, 25.0 g of glucose, 0.50 g of NaCl and 0.25 g of citric acid, were carefully dissolved in 500.0 ml of pure distilled water to produce a solution having: 5% sucrose, 5% glucose, 1000 ppm NaCl, and 500 ppm citric acid. The "model" biological liquid medium was then divided into two equal parts and one was adjusted to pH 4.0 and the other adjusted to pH 6.0 with 2.5 N aqueous NaOH. The two separate solutions were then spiked with Fe by the addition of the appropriate amount of a 500 ppm $Fe^{3+}$ solution so that the final Fe concentration of each was 1.8 parts per million. 5 cm×5 cm pieces of the coatings prepared as described above were then contacted with 20.0 ml of the model biological liquid medium, at pH 4.0 and at pH 6.0. The pieces of the coatings were left in contact with the medium for the time indicated in Table 2, and a 1.0 ml aliquot of the medium was taken for Fe analysis via inductively coupled plasma—atomic emission spectroscopy. A comparison example was prepared using a 5 cm×5 cm piece of the polymeric support which did not contain a coating of the inventive composition. The data are given in Table 2.

TABLE 2

| Example or Comparison Example | pH | coating | Concentration (ppm) Fe after 1 d | Concentration (ppm) Fe after 2 d |
|---|---|---|---|---|
| C-1 | 4.0 | none | 1.73 | 1.70 |
| E-1 | 4.0 | 1 | 0.35 | 0.14 |
| E-2 | 4.0 | 2 | 0.32 | 0.09 |
| E-3 | 4.0 | 3 | 0.34 | 0.10 |
| C-2 | 6.0 | none | 1.82 | 1.81 |
| E-4 | 6.0 | 1 | 0.35 | 0.07 |
| E-5 | 6.0 | 2 | 0.35 | 0.05 |
| E-6 | 6.0 | 3 | 0.47 | 0.12 |

The data of Table 2 indicate that the inventive coatings are able to sequester iron from a liquid medium, and able to sequester iron from a liquid medium containing representative biological compounds. The comparison example shows no reduction of iron after two days exposure. In some cases more than 95% of the free iron is removed from the model biological liquid medium, and the level of iron contamination is reduced to as low as 50 ppb (0.05 ppm). The functionalized mordant polymers show a high degree of Fe removal even at relatively low pH (high acidity).

The invention has been described in detail with particular reference to certain preferred embodiments thereof, but it will be understood that variations and modifications can be effected within the spirit and scope of the invention.

What is claimed is:

1. A composition of matter comprising a functionalized mordant polymer comprising a cationic polymer having an adsorbed metal-ion sequestrant, wherein the metal-ion sequestrant has a stability constant greater than $10^{10}$ with iron (III).

2. The composition of matter of claim 1 wherein said cationic polymer comprises a quaternary ammonium or a quaternary phosphonium group.

3. The composition of matter of claim 1 wherein said cationic polymer is represented by formula I:

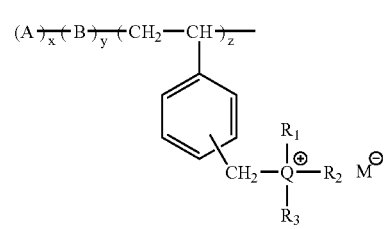

wherein:

A represents units of an addition polymerizable monomer containing at least two ethylenically unsaturated groups;

B represents units of a copolymerizable, α,β-ethylenically unsaturated monomer;

Q is N or P;

$R_1$, $R_2$ and $R_3$ each independently represents a carbocyclic or alkyl group;

$M^-$ is an anion;

x is from 0.25 to 10 mole percent;

y is from 0 to 90 mole percent; and z is from 10 to 99 mole percent.

4. The composition of matter of claim 1 wherein the functionalized mordant polymer is in the form of functionalized mordant latex particles, and said cationic polymer is in the form of cationic latex particles.

5. The composition of matter of claim 4 wherein said cationic latex particles comprise a cationic polymer represented by formula I:

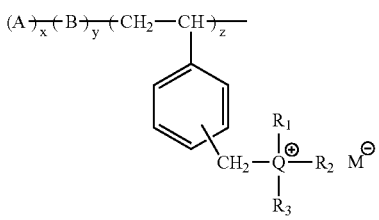

wherein:
A represents units of an addition polymerizable monomer containing at least two ethylenically unsaturated groups;
B represents units of a copolymerizable, α,β-ethylenically unsaturated monomer;
Q is N or P;
$R_1$, $R_2$ and $R_3$ each independently represents a carbocyclic or alkyl group;
$M^-$ is an anion;
x is from 0.25 to 10 mole percent;
y is from 0 to 90 mole percent;
z is from 10 to 99 mole percent.

6. The composition of matter of claim 4 wherein said cationic latex particles have an average particle size of less than 500 nm.

7. The composition of matter of claim 4 wherein said cationic latex particles have an average particle size of less than 100 nm.

8. The composition of matter of claim 1 wherein said metal-ion sequestrant has a stability constant greater than $10^{10}$ for copper, zinc, aluminum or heavy metals.

9. The composition of matter of claim 1 wherein said metal-ion sequestrant has a stability constant for iron greater than $10^{20}$.

10. The composition of matter of claim 1 wherein said metal-ion sequestrant has a stability constant for iron greater than $10^{30}$.

11. The composition of matter of claim 1 wherein said metal-ion sequestrant comprises an alpha amino carboxylate functional group.

12. The composition of matter of claim 1 wherein said metal-ion sequestrant comprises a hydroxamate or a catechol functional group.

13. The composition of claim 2 wherein the cationic polymer is an ammonium or phosphonium ion salt of polyvinyl alcohol, polyurethane, polyester, nylon, polyethylene-polyvinyl alcohol copolymer, polystyrene, ethyl cellulose, cellulose acetate, cellulose nitrate, polyacrylic acid, polyamide, polymethacrylate, polyethylene terephthalate, polyethylene, polypropylene, or polyacrylonitrile.

14. The composition of claim 1 wherein said functionalized mordant polymers are immobilized on or in a support.

15. The composition of claim 14 wherein the support is paper, metal, plastic, glass, wood, or textiles.

16. The composition of claim 4 wherein said functionalized mordant latex particles are contained in a binder.

17. The composition of claim 16 wherein the binder comprises one or more of polyvinyl alcohol, polyethylene glycol, cellophane, water-based polyurethanes, polyester, nylon, polyethylene-polyvinyl alcohol copolymer, polystyrene, ethyl cellulose, cellulose acetate, cellulose nitrate, aqueous latexes, polyacrylic acid, polystyrene sulfonate, polyamide, polymethacrylate, polyethylene terephthalate, polystyrene, polyethylene and polypropylene or polyacrylonitrile or copolymers thereof.

18. An article comprising a functionalized mordant polymer comprising a cationic polymer having an adsorbed metal-ion sequestrant, wherein the metal-ion sequestrant has a stability constant greater than $10^{10}$ with iron (III).

19. The article of claim 18 wherein the functionalized mordant polymer is contained in a polymer layer, said layer being located on the surface of the article.

20. The article of claim 18 wherein the functionalized mordant polymer is incorporated into the materials forming the article.

21. The article of claim 18 wherein the functionalized mordant polymer is in the form of functionalized mordant latex particles, and said cationic polymer is in the form of cationic latex particles.

22. The article of claim 21 wherein the functionalized mordant latex particles are incorporated into the materials forming the article.

23. The article of claim 21 wherein the functionalized mordant latex particles are immobilized in a polymer layer, said layer being located on the surface of the article.

24. The article of claim 18 wherein the article is comprised of paper, metal, plastic, glass, wood, or textiles.

25. The article of claim 18 wherein said cationic polymer comprises a quaternary ammonium or a quaternary phosphonium group.

26. The article of claim 18 wherein said cationic polymer is represented by formula I:

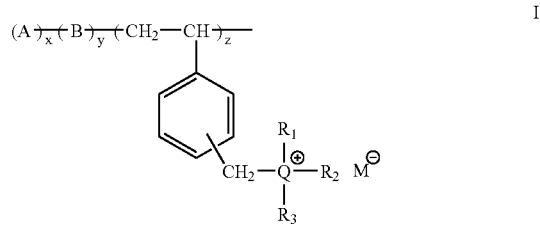

wherein:
A represents units of an addition polymerizable monomer containing at least two ethylenically unsaturated groups;
B represents units of a copolymerizable, α,β-ethylenically unsaturated monomer;
Q is N or P;
$R_1$, $R_2$ and $R_3$ each independently represents a carbocyclic or alkyl group;
$M^-$ is an anion;
x is from 0.25 to 10 mole percent;
y is from 0 to 90 mole percent; and
z is from 10 to 99 mole percent.

27. The article of claim 23 wherein the polymer layer comprises one or more of polyvinyl alcohol, polyethylene glycol, cellophane, water-based polyurethanes, polyester, nylon, polyethylene-polyvinyl alcohol copolymer, polystyrene, ethyl cellulose, cellulose acetate, cellulose nitrate, aqueous latexes, polyacrylic acid, polystyrene sulfonate, polyamide, polymethacrylate, polyethylene terephthalate, polystyrene, polyethylene and polypropylene or polyacrylonitrile or copolymers thereof.

28. The article of claim 19 wherein the polymer layer further comprises one or more of polyvinyl alcohol, polyethylene glycol, cellophane, water-based polyurethanes, polyester, nylon, polyethylene-polyvinyl alcohol copolymer, polystyrene, ethyl cellulose, cellulose acetate, cellulose nitrate, aqueous latexes, polyacrylic acid, polystyrene sulfonate, polyamide, polymethacrylate, polyethylene terephthalate, polystyrene, polyethylene and polypropylene or polyacrylonitrile or copolymers thereof.

29. The article of claim 18 wherein said metal-ion sequestrant has a stability constant with iron greater than $10^{20}$.

30. The article of claim 18 wherein said metal-ion sequestrant has a stability constant with iron greater than $10^{30}$.

31. The article of claim 18 wherein said metal-ion sequestrant comprises an alpha amino carboxylate, a hydroxamate, or a catechol functional group.

32. The article of claim 18 wherein said metal-ion sequestrant has a stability constant greater than $10^{10}$ with copper, zinc, aluminum or heavy metals.

33. The article of claim 21 wherein said cationic polymer is represented by formula I:

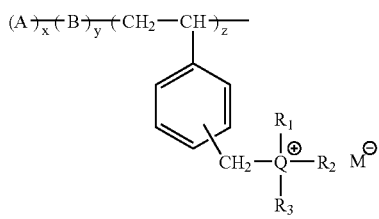

wherein:
A represents units of an addition polymerizable monomer containing at least two ethylenically unsaturated groups;
B represents units of a copolymerizable, α,β-ethylenically unsaturated monomer;
Q is N or P;
$R_1$, $R_2$ and $R_3$ each independently represents a carbocyclic or alkyl group;
$M^-$ is an anion;
x is from 0.25 to 10 mole percent;
y is from 0 to 90 mole percent; and
z is from 10 to 99 mole percent.

34. The article of claim 19 further comprising a barrier layer; wherein the polymeric layer is between the surface of the article and the barrier layer and wherein the barrier layer does not contain the functionalized mordant polymer.

35. The article of claim 23 further comprising a barrier layer; wherein the polymeric layer is between the surface of the article and the barrier layer and wherein the barrier layer does not contain the functionalized mordant latex particles.

36. The article of claim 34 wherein the barrier layer is permeable to liquid media.

37. The article of claim 35 wherein the barrier layer is permeable to liquid media.

38. The article of claim 34 wherein the barrier layer has a water permeability of greater than 1000 $[(cm^3cm)/(cm^2sec/Pa)] \times 10^{13}$.

39. The article of claim 35 wherein the barrier layer has a water permeability of greater than 1000 $[(cm^3cm)/(cm^2sec/Pa)] \times 10^{13}$.

40. The article of claim 34 wherein the barrier layer prevents the diffusion or passage of micro-organisms.

41. The article of claim 35 wherein the barrier layer prevents the diffusion or passage of micro-organisms.

42. A method of removing target metal-ions from an environment comprising contacting the environment with a composition comprising a functionalized mordant polymer comprising a cationic polymer having an adsorbed metal-ion sequestrant, wherein the metal-ion sequestrant has a stability constant greater than $10^{10}$ with iron (III).

43. The method of claim 42 wherein the environment is a liquid medium.

44. The method of claim 43 wherein the target metal-ion concentration in the liquid medium is reduced to less than 100 ppb.

45. The method of claim 43 wherein the target metal ion is iron.

46. The method of claim 45 wherein the iron concentration in the liquid medium is reduced to less than 50 ppb.

47. The method of claim 42 wherein said metal-ion sequestrant has a stability constant for iron greater than $10^{20}$.

48. The method of claim 42 wherein said metal-ion sequestrant has a stability constant for iron greater than $10^{30}$.

49. The method of claim 42 wherein said metal-ion sequestrant comprises an alpha amino carboxylate, a hydroxamate, or a catechol functional group.

50. The method of claim 42 wherein said cationic polymer comprises a quaternary ammonium or a quaternary phosphonium group.

51. The method of claim 42 wherein said cationic polymer is represented by formula I:

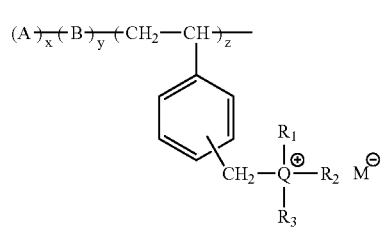

wherein:
A represents units of an addition polymerizable monomer containing at least two ethylenically unsaturated groups;
B represents units of a copolymerizable, α,β-ethylenically unsaturated monomer;
Q is N or P;
$R_1$, $R_2$ and $R_3$ each independently represents a carbocyclic or alkyl group;
$M^-$ is an anion;
x is from 0.25 to 10 mole percent;
y is from 0 to 90 mole percent; and
z is from 10 to 99 mole percent.

52. The method of claim 42 wherein the functionalized mordant polymer is in the form of functionalized mordant latex particles, and said cationic polymer is in the form of cationic latex particles.

* * * * *